United States Patent
Iwata et al.

(10) Patent No.: US 10,422,275 B2
(45) Date of Patent: Sep. 24, 2019

(54) TURBOCHARGER

(71) Applicant: TOYOTA JIDOSHA KABUSHIKI KAISHA, Toyota-shi, Aichi-ken (JP)

(72) Inventors: Akitoshi Iwata, Seto (JP); Takato Hatano, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 55 days.

(21) Appl. No.: 15/913,970

(22) Filed: Mar. 7, 2018

(65) Prior Publication Data

US 2018/0258841 A1 Sep. 13, 2018

(30) Foreign Application Priority Data

Mar. 13, 2017 (JP) .................................. 2017-047387

(51) Int. Cl.
*F02B 37/18* (2006.01)
*F02M 26/67* (2016.01)
*F02M 26/53* (2016.01)

(52) U.S. Cl.
CPC ............ *F02B 37/186* (2013.01); *F02B 37/18* (2013.01); *F02M 26/53* (2016.02); *F02M 26/67* (2016.02); *Y02T 10/144* (2013.01)

(58) Field of Classification Search
CPC ...... F02B 37/186; F02M 26/67; F02M 26/18; F02M 26/53; F02M 26/68; F02M 26/58; F02M 2026/001; Y02T 10/144
See application file for complete search history.

(56) References Cited

U.S. PATENT DOCUMENTS

| | | | |
|---|---|---|---|
| 2007/0204616 A1* | 9/2007 | Martin | F02B 37/162 60/602 |
| 2009/0020167 A1 | 1/2009 | Koester | |
| 2014/0075933 A1* | 3/2014 | Jaegle | F02B 37/186 60/602 |
| 2015/0247450 A1* | 9/2015 | Micanek | F02B 47/08 60/602 |
| 2015/0330292 A1* | 11/2015 | Keller | F01D 17/12 415/145 |
| 2018/0266310 A1* | 9/2018 | Sadamitsu | F01D 17/105 |

FOREIGN PATENT DOCUMENTS

| | | | |
|---|---|---|---|
| EP | 3 199 778 A1 | 8/2017 | |
| EP | 3199778 A1 * | 8/2017 | ............. F02B 37/18 |
| GB | 2 530 824 A | 4/2016 | |

(Continued)

*Primary Examiner* — Patrick D Maines
(74) *Attorney, Agent, or Firm* — Oliff PLC (57) ABSTRACT

A wastegate valve device for a turbocharger includes a valve body, a swing arm configured to support the valve body, a rotating shaft to which the swing arm is fixed, a drive arm fixed to the rotating shaft, and a rod connected to the drive arm. The drive arm includes a fixed portion to which the rotating shaft is fixed, a first extension portion where the rod is connected, and a second extension portion extending on the opposite side of the first extension portion. The turbine housing is provided with a stopper with which the second extension portion abuts at the time when the valve body is distanced from the wastegate port due to a rotation of the rotating shaft in a valve-opening direction.

3 Claims, 5 Drawing Sheets

(56) References Cited

FOREIGN PATENT DOCUMENTS

| GB | 2530824 A | * | 4/2016 | ............ F02B 37/186 |
| JP | 2012-067698 A | | 4/2012 | |
| JP | 2012140889 A | * | 7/2012 | |
| WO | WO-2005073536 A1 | * | 8/2005 | ............ F02B 37/025 |
| WO | 2017/119012 A1 | | 7/2017 | |

* cited by examiner

TURBOCHARGER

INCORPORATION BY REFERENCE

The disclosure of Japanese Patent Application No. 2017-047387 filed on Mar. 13, 2017 including the specification, drawings and abstract is incorporated herein by reference in its entirety.

BACKGROUND

1. Technical Field

The present disclosure relates to a turbocharger including a wastegate valve device.

2. Description of Related Art

Inside a turbine housing for a turbocharger described in Japanese Unexamined Patent Application Publication No. 2012-67698 (JP 2012-67698 A), a wastegate port through which exhaust gas flows by detouring around a turbine wheel is formed. A wastegate valve device for the turbocharger includes a valve body configured to open and close the wastegate port, a rotating shaft inserted through an insertion hole formed on a side wall of the turbine housing, and a swing arm fixed to the rotating shaft. The swing arm supports the valve body at a position distanced from a part fixed to the rotating shaft in the radial direction of the rotating shaft. Accordingly, the valve body is configured to open and close the wastegate port such that the rotating shaft and the swing arm rotate around the rotating shaft as the axial center. More specifically, when the rotating shaft and the swing arm are rotated in a first direction, the valve body can approach the wastegate port, and when the rotating shaft and the swing arm are rotated in a second direction that is a reverse direction with respect to the first direction, the valve body can be distanced from the wastegate port.

Further, the wastegate valve device is provided with a drive arm placed outside the turbine housing and fixed to the rotating shaft, and a rod rotatably connected to the drive arm. More specifically, the rod is rotatably connected to the drive arm at a position distanced from a part fixed to the rotating shaft in the radial direction of the rotating shaft. When the rod is pulled toward a compressor housing of the turbocharger by driving of an electric actuator, the drive arm, the rotating shaft, and the swing arm are rotated in the second direction, so that the valve body is distanced from the wastegate port. Hereby, the exhaust gas flowing into the turbine wheel passes through the wastegate port.

SUMMARY

In the meantime, in the wastegate valve device, the valve body is placed on the downstream side from the wastegate port in the turbine housing. Accordingly, when the valve body is distanced from the wastegate port, the exhaust gas passing through the wastegate port interferes with the valve body. That is, the valve body receives a load corresponding to the pressure of the exhaust gas. At this time, when a load to be received by the valve body fluctuates due to pulsation of the pressure of the exhaust gas that interferes with the valve body, the rotating shaft connected to the valve body via the swing arm vibrates. As a result, an abnormal noise might occur due to the rotating shaft abutting with the peripheral wall of the insertion hole.

An aspect of the present disclosure is related to a turbocharger in which a turbine housing and a compressor housing are arranged in a reference direction, an outflow portion via which exhaust gas flowing through the turbine housing flows out into an exhaust pipe is provided, the outflow portion is provided on a distant side of the turbine housing from the compressor housing in the reference direction.

The turbocharger includes a valve body placed on an outflow portion side in the reference direction from a wastegate port and configured to open and close the wastegate port, the wastegate port inside the turbine housing being configured to cause the exhaust gas to detour around a turbine wheel. The turbocharger also includes a rotating shaft extending in a direction intersecting with the reference direction, the rotating shaft being inserted through an insertion hole provided on a side wall of the turbine housing. The turbocharger also includes a swing arm fixed to the rotating shaft and configured to support the valve body at a position distanced from a part of the swing arm fixed to the rotating shaft in a radial direction of the rotating shaft, a drive arm placed outside the turbine housing and fixed to the rotating shaft, a rod rotatably connected to the drive arm at a position distanced from a part where the rotating shaft is fixed to the drive arm, and an actuator. The rod is displaced toward a side approaching the compressor housing in the reference direction by driving of the actuator. The drive arm, the rotating shaft, and the swing arm rotate in a valve-opening direction when the rod is displaced, so that the valve body is displaced toward a side approaching the outflow portion so as to be distanced from the wastegate port.

The drive arm includes a fixed portion to which the rotating shaft is fixed, a first extension portion, and a second extension portion. The first extension portion extends from the fixed portion in a first direction intersecting with an extending direction of the rotating shaft and the rod is connected to the first extension portion. The second extension portion extends in a second direction intersecting with the extending direction of the rotating shaft from a part of the fixed portion on an opposite side from the first extension portion. The turbine housing is provided with a stopper configured to abut with the second extension portion. The stopper is on a valve-opening direction side from the second extension portion when the valve body closes the wastegate port. The stopper is configured to abut with the second extension portion when the valve body is distanced from the wastegate port. The valve-opening direction is one rotation direction around the rotating shaft.

In the above aspect, when the drive arm, the rotating shaft, and the swing arm rotate in the valve-opening direction due to driving of the actuator, the valve body is displaced to approach the outflow portion, so that the wastegate port is opened. Hereby, the exhaust gas flows through the wastegate port.

Further, when the second extension portion abuts with the stopper while the drive arm is rotating in the valve-opening direction, further rotations of the drive arm, the rotating shaft, and the swing arm in the valve-opening direction are restricted. When a driving force from the actuator is still input into the first extension portion of the drive arm after the rotations of the drive arm, the rotating shaft, and the swing arm are restricted, a force to displace the fixed portion toward the compressor housing side in the reference direction is applied to the drive arm, with a part abutting with the stopper serving as a fulcrum. Accordingly, an outer end of the rotating shaft is pressed toward the compressor housing side in the reference direction by the driving force input via the first extension portion, the outer end being an end placed outside the turbine housing.

In the meantime, when the valve body is distanced from the wastegate port, the exhaust gas passing through the wastegate port interferes with the valve body. The exhaust gas passing through the wastegate port flows toward the outflow portion. Accordingly, an inner end of the rotating shaft, which is an end placed inside the turbine housing, is pressed by a load received by the valve body from the exhaust gas, toward the opposite side with respect to the compressor housing side in the reference direction, namely, toward the outflow portion side.

That is, in the above aspect, when the valve body is distanced from the wastegate port, the rotating shaft is inclined with respect to the central axis of the insertion hole due to the driving force from the actuator, which is transmitted to the rotating shaft via the drive arm, and the load received by the valve body from the exhaust gas. Hereby, the rotating shaft is pressed against an inside opening edge of the insertion hole and an outside opening edge of the insertion hole, the inside opening edge being inside the turbine housing, the outside opening edge being outside the turbine housing. Besides, the direction of the load received by the inner end of the rotating shaft is different by approximately 180° from the direction of the driving force input into the outer end of the rotating shaft. Accordingly, a position of a part of the inside opening edge abutting with the rotating shaft relative to the central axis of the insertion hole is different by approximately 180° from a position of a part of the outside opening edge abutting with the rotating shaft relative to the central axis of the insertion hole.

Hereby, in the above aspect, when the wastegate port is distanced from the valve body, the drive arm is pressed against the stopper. Further, the rotating shaft is inclined such that the rotating shaft is pressed against the inside opening edge at a position on the outflow portion side, and the rotating shaft is pressed against the outside opening edge at a position on the compressor housing side. Accordingly, even if a load to displace the valve body toward the outflow portion side is applied to the valve body, the rotating shaft is not displaced. Further, even if the pressure of the exhaust gas interfering with the valve body pulsates and the load received by the inner end of the rotating shaft from the exhaust gas fluctuates, the forces to press the rotating shaft against the opening edges just fluctuate, so that it is possible to restrain the rotating shaft, the swing arm, and the valve body from vibrating. Accordingly, it is possible to restrain the occurrence of abnormal noise caused due to vibration of the rotating shaft at the time when the valve body is distanced from the wastegate port.

In the above aspect, the stopper may be placed on a rotational locus of a distal part which is a part of the second extension portion on a distal end side from a center of the second extension portion. The outflow portion may include a flange configured to connect the exhaust pipe to the turbine housing. A distal end side of a front edge of the second extension portion may be on a valve-closing direction side from a base end side of the front edge of the second extension portion. The stopper may be placed on a compressor housing side in the reference direction from the flange. The valve-closing direction is a rotation direction reverse to the valve-opening direction. The front edge of the second extension portion is an edge of the second extension portion on the valve-opening direction side.

According to the above aspect, the interval between the stopper and the flange can hardly become short in the reference direction. Further, when the wastegate port is closed by the valve body, the distal end of the first extension portion in the drive arm can hardly approach the outflow portion in the reference direction. On this account, it is not necessary to set a large difference between the position of the rotating shaft and the position of the flange in the reference direction. That is, even if the flange is placed so as not to be distanced from the rotating shaft in the reference direction, the driving arm does not make contact with the flange. Accordingly, it is possible to restrain upsizing of the turbine housing in the reference direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
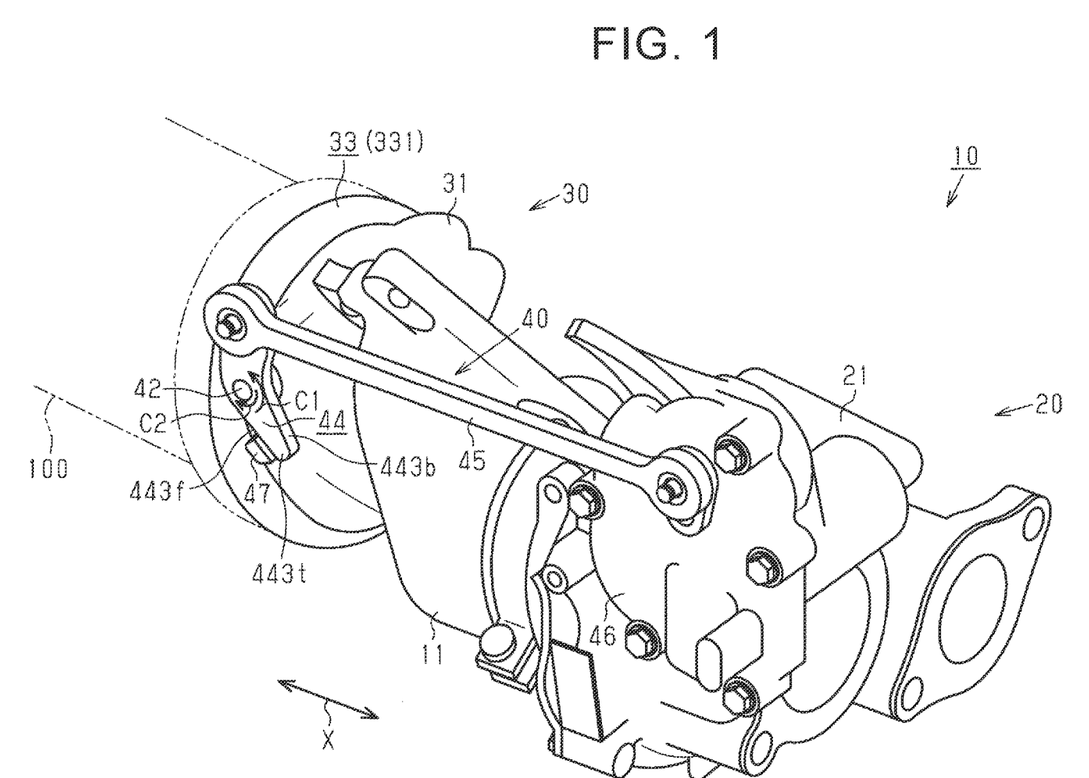
FIG. 1 is a perspective view illustrating an outline of a turbocharger of an embodiment.
Figure 2:
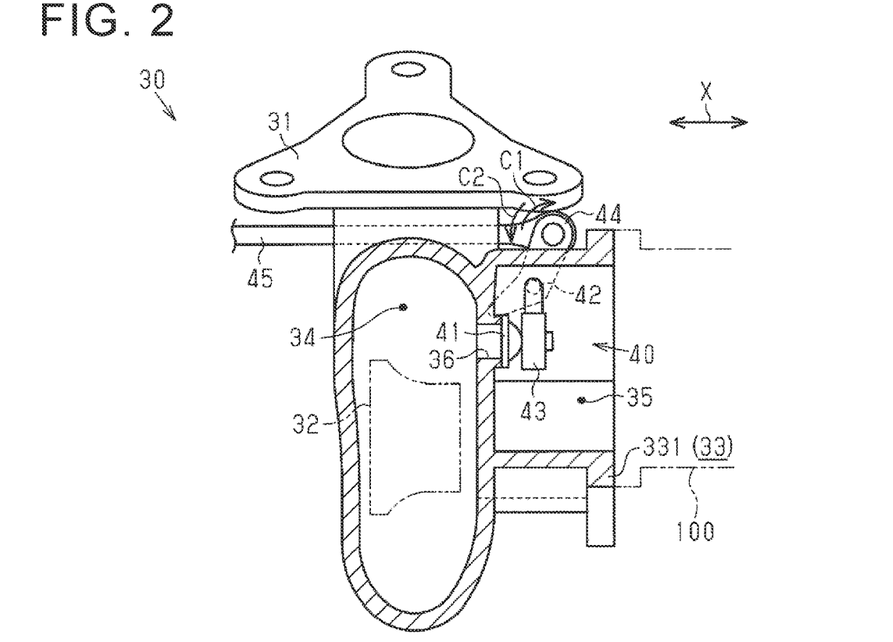
FIG. 2 is a sectional view illustrating a configuration of a turbine of the turbocharger.

One embodiment of a turbocharger is described below with reference to the drawings. As illustrated in FIG. 1, a turbocharger 10 of the present embodiment includes a compressor housing 21 constituting a compressor 20, a turbine housing 31 constituting a turbine 30, and a bearing housing 11 placed between the compressor housing 21 and the turbine housing 31. The direction where three housings 11, 21, 31 are arranged is referred to as a "reference direction X." A compressor wheel is accommodated inside the compressor housing 21, and a turbine wheel 32 is accommodated inside the turbine housing 31 as illustrated in FIG. 2. The bearing housing 11 rotatably supports a connecting shaft connecting the compressor wheel to the turbine wheel 32.

As illustrated in FIGS. 1 and 2, in terms of the opposite ends of the turbine housing 31 in the reference direction X, the end on the side distant from the compressor housing 21 serves as an outflow portion 33 to which an exhaust pipe 100 is connected. The exhaust pipe 100 is configured such that exhaust gas flowing out from the turbine housing 31 flows through the exhaust pipe 100. The outflow portion 33 is provided with a flange 331 to be connected to the exhaust pipe 100.

As illustrated in FIG. 2, the turbine housing 31 includes a scroll passage 34 formed therein such that the scroll passage 34 extends so as to surround the turbine wheel 32.

The turbine wheel 32 rotates when the exhaust gas flowing into the scroll passage 34 is blown to the turbine wheel 32. Hereby, the compressor wheel connected to the turbine wheel 32 via the connecting shaft rotates, so that forced induction is performed in the compressor housing 21. Note that the exhaust gas blown to the turbine wheel 32 flows through a discharge passage 35 and then flows out into the exhaust pipe 100 via the outflow portion 33.

Further, the turbine housing 31 is provided with a wastegate port 36 formed therein. The wastegate port 36 is a passage that connects the scroll passage 34 to the discharge passage 35 by detouring around the turbine wheel 32. Note that, in the present embodiment, the wastegate port 36 extends in the reference direction X.

Figure 3:
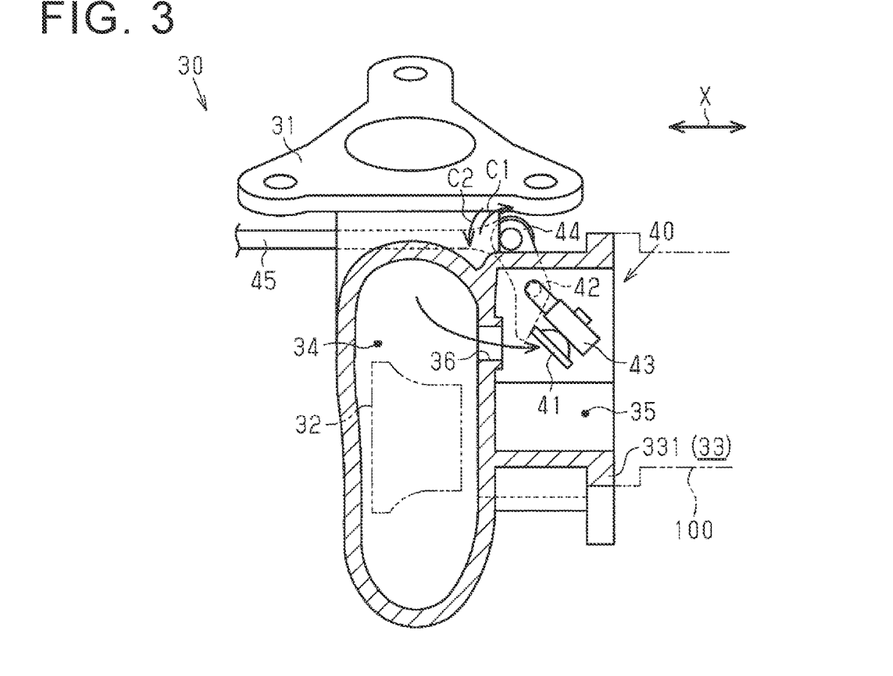
FIG. 3 is a sectional view illustrating the configuration of the turbine of the turbocharger.

Next, a wastegate valve device 40 of the turbocharger 10 will be described. As illustrated in FIGS. 2 and 3, the wastegate valve device 40 includes a valve body 41 configured to open and close the wastegate port 36. The valve body 41 is placed on the opposite side of the wastegate port 36 with respect to the turbine wheel 32 in the reference direction X, that is, placed closer to the outflow portion 33 than the wastegate port 36. When the valve body 41 abuts with the turbine housing 31 as illustrated in FIG. 2, the wastegate port 36 is closed by the valve body 41.

Figure 4:
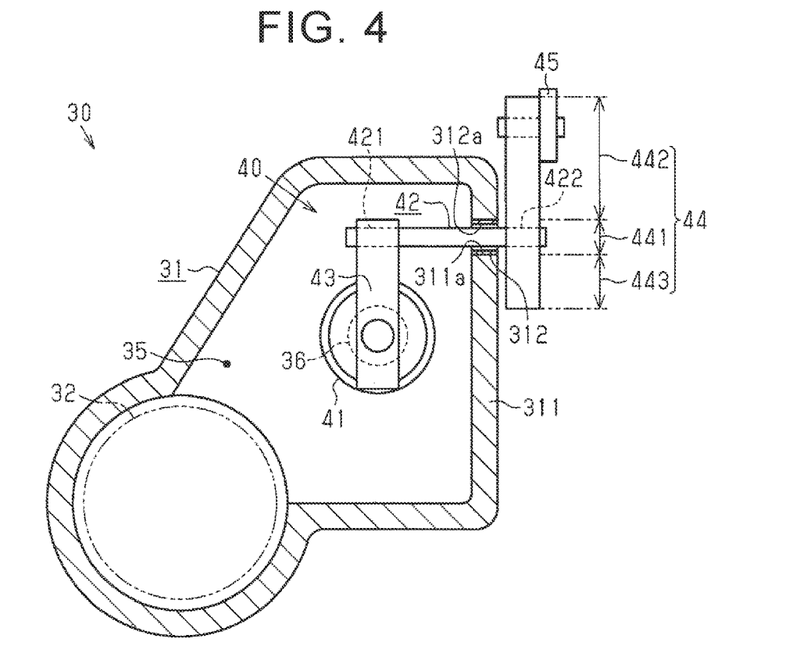
FIG. 4 is a sectional view illustrating the configuration of the turbine of the turbocharger.

In the meantime, when the valve body 41 is distanced from the turbine housing 31 toward the outflow portion 33 side (the right side in FIG. 3) as illustrated in FIG. 3 and the wastegate port 36 is not closed by the valve body 41, that is, when the wastegate port 36 is opened, the exhaust gas flowing through the scroll passage 34 flows into the discharge passage 35 through the wastegate port 36. When the exhaust gas passing through the scroll passage 34 flows into the discharge passage 35 via the wastegate port 36 in a way described as above, the amount of the exhaust gas to be blown to the turbine wheel 32 is decreased. Accordingly, when the wastegate port 36 is opened, rotations of the turbine wheel 32 and the compressor wheel are restrained, thereby restraining forced induction, Further, as illustrated in FIG. 4, a side wall 311 of the turbine housing 31 has a communicating hole 311a via which the inside of the turbine housing 31 communicates with the outside of the turbine housing 31, and a bush 312 having a cylindrical shape is press-fitted to the communicating hole 311a. The extending direction of the communicating hole 311a, that is, the extending direction of the bush 312, is perpendicular to the reference direction X. The reference direction X is the direction perpendicular to the plane of paper of FIG. 4. Note that the extending direction of the bush 312 may not necessarily be perpendicular to the reference direction X as long as the extending direction of the bush 312 intersects with the reference direction X.

As illustrated in FIGS. 2 and 4, the wastegate valve device 40 is provided with a rotating shaft 42 inserted through an insertion hole 312a formed inside the bush 312. That is, the rotating shaft 42 is supported by the side wall 311 in a rotatable state. A swing arm 43 is fixed to an inner portion 421 that is a part of the rotating shaft 42, the part being placed inside the turbine housing 31. The swing arm 43 supports the valve body 41 at a position distanced, in the radial direction of the rotating shaft 42, from a part of the swing arm 43 where the swing arm 43 is fixed to the rotating shaft 42. Since the valve body 41 is connected to the rotating shaft 42 via the swing arm 43, when the rotating shaft 42 and the swing arm 43 rotate, the valve body 41 rotates. That is, when the rotating shaft 42 and the swing arm 43 rotate in a valve-closing direction C1 that is the clockwise direction in FIGS. 2 and 3, the valve body 41 is displaced to a side approaching the wastegate port 36. In the meantime, when the rotating shaft 42 and the swing arm 43 rotate in a valve-opening direction C2 that is the counterclockwise direction in FIGS. 2 and 3, the valve body 41 is displaced to a side distanced from the wastegate port 36.

Further, as illustrated in FIG. 4, the wastegate valve device 40 includes a drive arm 44 placed outside the turbine housing 31, and a rod 45 rotatably connected to the drive arm 44. As illustrated in FIG. 1, a first end of the rod 45 is connected to the drive arm 44, while a second end of the rod 45 is connected to an electrically-driven actuator 46 supported by the compressor housing 21.

Figure 5:
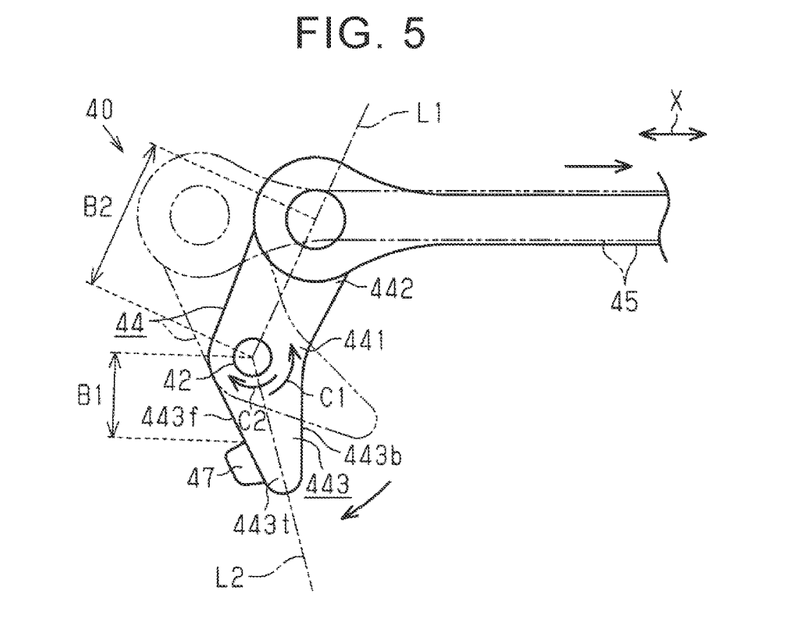
FIG. 5 is a side view illustrating a state where a drive arm and a rotating shaft rotate in a wastegate valve device of the turbocharger.

As illustrated in FIG. 4, an outer portion 422 of the rotating shaft 42 is fixed to the drive arm 44. The outer portion 422 is a part placed outside the turbine housing 31. Hereby, the drive arm 44 rotates in an integrated manner together with the rotating shaft 42 and the swing arm 43 around the rotating shaft 42. Further, as illustrated in FIGS. 4 and 5, the drive arm 44 includes a fixed portion 441 to which the rotating shaft 42 is fixed, and two extension portions 442, 443 extending from the fixed portion 441 in a direction perpendicular to the extending direction of the rotating shaft 42. Note that the extending direction of the extension portions 442, 443 may not necessarily be perpendicular to the extending direction of the rotating shaft 42 as long as the extending direction of the extension portions 442, 443 intersects with the extending direction of the rotating shaft 42.

The rod 45 is connected to a distal part of the first extension portion 442 out of the extension portions 442, 443. That is, the rod 45 is connected to the drive arm 44 at a position different from the fixed portion 441 that is a part to which the rotating shaft 42 is fixed. Further, the second extension portion 443 out of the extension portions 442, 443 extends from a part of the fixed portion 441 on the opposite side from the first extension portion 442.

As illustrated in FIG. 5, in the second extension portion 443, an edge on the valve-opening direction C2 side is referred to as a front edge 443f, and an edge on the valve-closing direction C1 side is referred to as a rear edge 443b. In this case, the front edge 443f is inclined to a line L2 extending in the extending direction of the second extension portion 443, so that a distal end side thereof is placed on the valve-closing direction C1 side from a base end side thereof. Further, the interval between the front edge 443f and the rear edge 443b is gradually narrowed as it goes from the base end side of the second extension portion 443 toward the distal end side thereof. Further, the line L2 extending in the extending direction of the second extension portion 443 deviates from a line L1 extending in the extending direction of the first extension portion 442, along the valve-closing direction C1. That is, the drive arm 44 has a bending shape as a whole.

Further, as illustrated in FIGS. 1 and 5, the wastegate valve device 40 includes a stopper 47 placed on the valve-opening direction C2 side from the second extension portion 443 at the time when the valve body 41 closes the wastegate port 36. The stopper 47 is placed generally right below the rotating shaft 42 in FIG. 5 on the turbine housing 31. That is, the position of the stopper 47 is placed generally at the same position as the rotating shaft 42 in the reference direction X. Further, the stopper 47 is placed on a rotation locus of a distal part 443t of the second extension portion 443. When the valve body 41 is distanced from the wastegate port 36, the front edge 443f of the second extension portion 443 abuts with the stopper 47. Note that the distal part 443t of the second extension portion 443 is a part disposed on the distal side from the center of the second extension portion 443 in the extending direction of the second extension portion 443.

Note that the linear distance between an abutting part of the drive arm 44 with the stopper 47 and a fixed part of the drive arm 44 to the rotating shaft 42 is referred to as a first linear distance B1, and the linear distance between the fixed part of the drive arm 44 to the rotating shaft 42 and a connection part of the drive arm 44 to the rod 45 is referred to as a second linear distance B2. In this case, in the present embodiment, the first linear distance B1 is shorter than the second linear distance B2.

Next, operations and effects of the turbocharger 10 will be described. When the rod 45 is displaced due to driving of the actuator 46 in a state where the wastegate port 36 is closed by the valve body 41, so as to pull the drive arm 44 toward the compressor housing 21 side in the reference direction X as indicated by an arrow in FIG. 5, the drive arm 44, the rotating shaft 42, and the swing arm 43 are rotated in the valve-opening direction C2. When the rotating shaft 42 and the swing arm 43 are rotated in the valve-opening direction C2 as such, the valve body 41 connected to the rotating shaft 42 via the swing arm 43 is displaced so as to come closer to the outflow portion 33. Hereby, the valve body 41 is distanced from the wastegate port 36, so that the exhaust gas passes through the wastegate port 36 inside the turbine housing 31, as indicated by an arrow in FIG. 3.

In this case, the exhaust gas passing through the wastegate port 36 interferes with the valve body 41, and then flows out into the exhaust pipe 100 via the outflow portion 33. That is, the valve body 41 receives a load from the exhaust gas directed toward the outflow portion 33 through the wastegate port 36. Accordingly, the inner portion 421 of the rotating shaft 42 to which the valve body 41 is connected via the swing arm 43 is pushed toward the outflow portion 33 side in the reference direction X, namely, toward the opposite side from the compressor housing 21, as illustrated in FIG. 6.

Further, when the drive arm 44 rotates in the valve-opening direction C2 due to driving of the actuator 46, the front edge 443f of the second extension portion 443 in the drive arm 44 abuts with the stopper 47, so that further rotations of the drive arm 44 and the rotating shaft 42 in the valve-opening direction C2 are restricted. Even in this state, the driving of the actuator 46 is continued, so that the fixed portion 441 of the drive arm 44 is displaced toward the compressor housing 21 side in the reference direction X with the part of the drive arm 44 abutting with the stopper 47 serving as a fulcrum. Consequently, as illustrated in FIG. 6, the outer portion 422 of the rotating shaft 42 is pulled toward the compressor housing 21 side in the reference direction X due to a driving force P2 input into the first extension portion 442 from the actuator 46.

Figure 6:
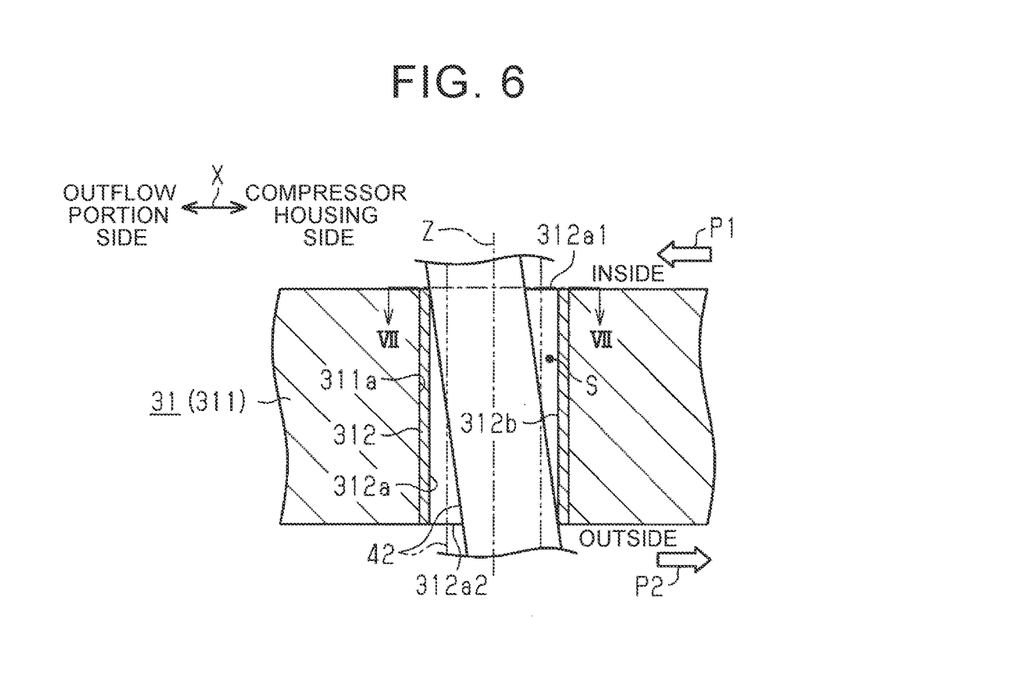
FIG. 6 is a sectional view schematically illustrating a state where the rotating shaft of the wastegate valve device is inclined.

That is, when the wastegate port 36 is opened, the rotating shaft 42 is inclined with respect to the central axis Z of the insertion hole 312a due to the driving force P2 transmitted from the actuator 46 to the rotating shaft 42 via the drive arm 44 and a load P1 received by the valve body 41 from the exhaust gas, as illustrated in FIG. 6. That is, due to actions of two forces in directions different from each other by approximately 180°, the rotating shaft 42 is pressed against an inside opening edge 312a1 and an outside opening edge 312a2 of the insertion hole 312a, the inside opening edge 312a1 being on the inside of the turbine housing 31, the outside opening edge 312a2 being on the outside of the turbine housing 31. In this case, as illustrated in FIG. 7, the position of a part of the inside opening edge 312a1 abutting with the rotating shaft 42 is different by approximately 180° from the position of a part of the outside opening edge 312a2 abutting with the rotating shaft 42 with respect to the central axis Z.

Accordingly, in the present embodiment, when the wastegate port 36 is opened, the drive arm 44 is pressed against the stopper 47. Further, by using two forces in application directions different from each other by approximately 180°, that is, the driving force P2 from the actuator 46 and the load P1 received by the valve body 41 from the exhaust gas, the rotating shaft 42 is pressed against the opening edges 312a1, 312a2. More specifically, the rotating shaft 42 is pressed against the inside opening edge 312a1 at a position on the outflow portion 33 side, and the rotating shaft 42 is pressed against the outside opening edge 312a2 at a position on the compressor housing 21 side. Accordingly, even if a force to displace the valve body 41 toward the outflow portion 33 side is applied to the valve body 41, the rotating shaft 42 is not displaced. That is, a state where the rotating shaft 42 is inclined is maintained. Further, even if the pressure of the exhaust gas interfering with the valve body 41 pulsates, the forces to press the rotating shaft 42 against the opening edges 312a1, 312a2 just fluctuate, so that it is possible to restrain the rotating shaft 42, the swing arm 43, and the valve body 41 from vibrating. That is, it is possible to restrain the occurrence of abnormal noise caused when the rotating shaft 42 abuts with the opening edges 312a1, 312a2.

Figure 7:
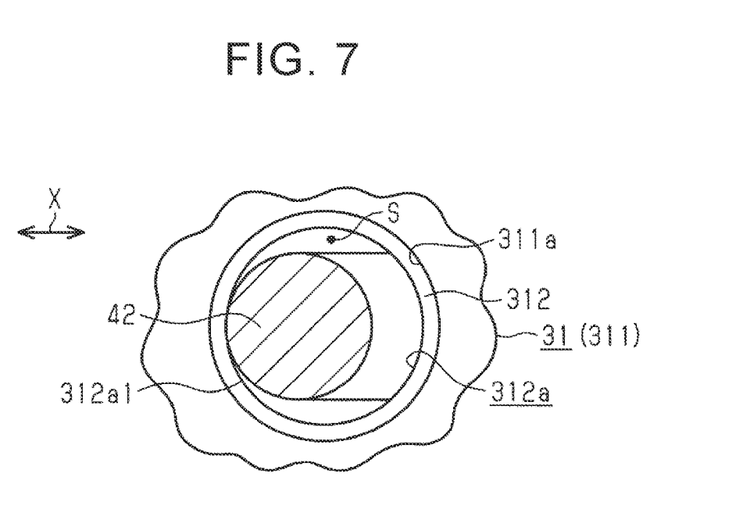
FIG. 7 is a sectional view taken along an arrow 7-7 in FIG. 6.

As illustrated in FIGS. 6 and 7, a small gap S is provided between a peripheral wall 312b of the insertion hole 312a and the rotating shaft 42, so that the exhaust gas flowing through the turbine housing 31 might leak outside via the gap S. The possibility that the exhaust gas leaks outside as such becomes lower as the occupying ratio of the rotating shaft 42 in the volume of the insertion hole 312a is larger.

Here, when the rotating shaft 42 vibrates, the occupying ratio of the rotating shaft 42 in the volume of the insertion hole 312a fluctuates. That is, the possibility that the exhaust gas leaks outside fluctuates. In this regard, in the present embodiment, it is possible to maintain the rotating shaft 42 to be inclined in the insertion hole 312a as illustrated in FIG. 6. In this case, since the position of the part of the inside opening edge 312a1 abutting with the rotating shaft 42 is different by approximately 180° from the position of the part of the outside opening edge 312a2 abutting with the rotating shaft 42 with respect to the central axis Z, it is possible to maintain the maximum occupying ratio of the rotating shaft 42 in the volume of the insertion hole 312a. Accordingly, in comparison with a case where the rotating shaft 42 vibrates in the insertion hole 312a, the exhaust gas flow through the turbine housing 31 can hardly leak outside via the gap S.

Note that, in the present embodiment, the stopper 47 is placed on the rotation locus of the distal part 443t of the second extension portion 443 in the drive arm 44, and the first linear distance B1 is shorter than the second linear distance B2. As a result, in comparison with a case where the first linear distance B1 is equal to or more than the second linear distance B2, it is possible to increase a force to be input into the outer portion 422 of the rotating shaft 42 at the time when the rotation of the drive arm 44 in the valve-opening direction C2 is restricted by the stopper 47. As a result, it is possible to increase the forces to press the rotating shaft 42 against the opening edges 312a1, 312a2, and eventually, it is possible to enhance vibration restraint effects of the rotating shaft 42, the swing arm 43, and the valve body 41.

Further, the front edge 443f of the second extension portion 443 in the drive arm 44 is inclined so that its distal end side is placed on the valve-closing direction C1 side with respect to its base end side. This makes it possible to restrain a difference between the position of the rotating shaft 42 and the position of the stopper 47 from increasing in the reference direction X.

Figure 9:
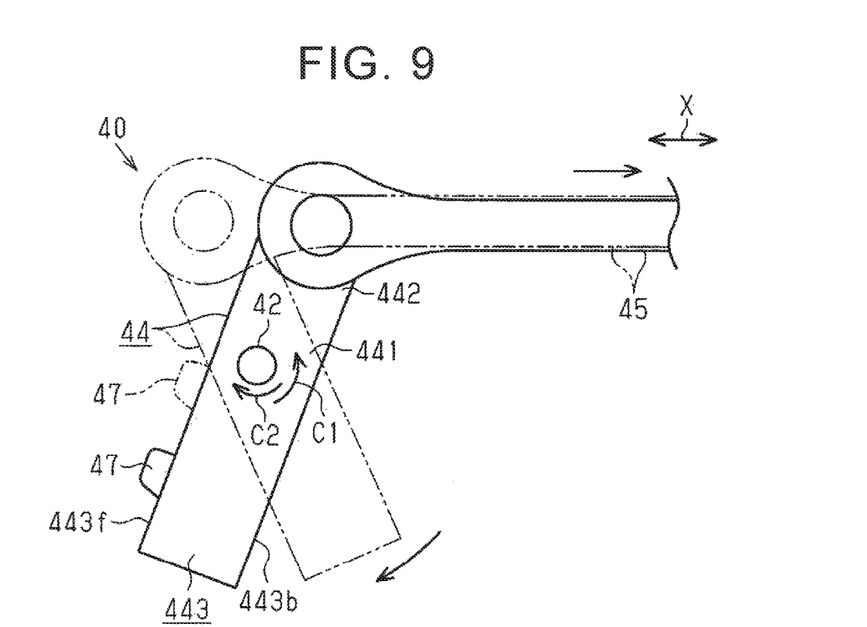
FIG. 9 is a side view illustrating a part of a turbocharger in another embodiment.

Here, a comparative example in which the front edge 443*f* is not inclined like the present embodiment is illustrated in FIG. 9. In the comparative example, as illustrated in FIG. 9, when the stopper 47 is placed on the outflow portion 33 side in the reference direction X, the front edge 443*f* can be placed so as not to abut with the stopper 47 at the time when the wastegate port 36 is closed by the valve body 41.

In this regard, in the present embodiment, the stopper 47 can be placed distanced from the outflow portion 33, in comparison with the comparative example. That is, it is not necessary to place the stopper 47 closer to the outflow portion 33 in the reference direction X. Further, when the stopper 47 is placed distanced from the outflow portion 33 as such, the distal end of the first extension portion 442 in the drive arm 44 can hardly approach the outflow portion 33 in the reference direction X in a state where the wastegate port 36 is closed by the valve body 41. That is, it is not necessary to set a large difference between the position of the flange 331 and the position of the rotating shaft 42 in the reference direction X. This accordingly makes it possible to restrain upsizing of the turbine housing 31 in the reference direction X.

Further, the stopper 47 is placed at a position which is closer to the drive arm 44 than the flange 331. Accordingly, even if the rotating shaft 42 is placed near the flange 331 like the present embodiment, it is possible to avoid such a situation that the drive arm 44 makes contact with the flange 331 at the time when the drive arm 44 is rotated in the valve-opening direction C2.

Figure 8:
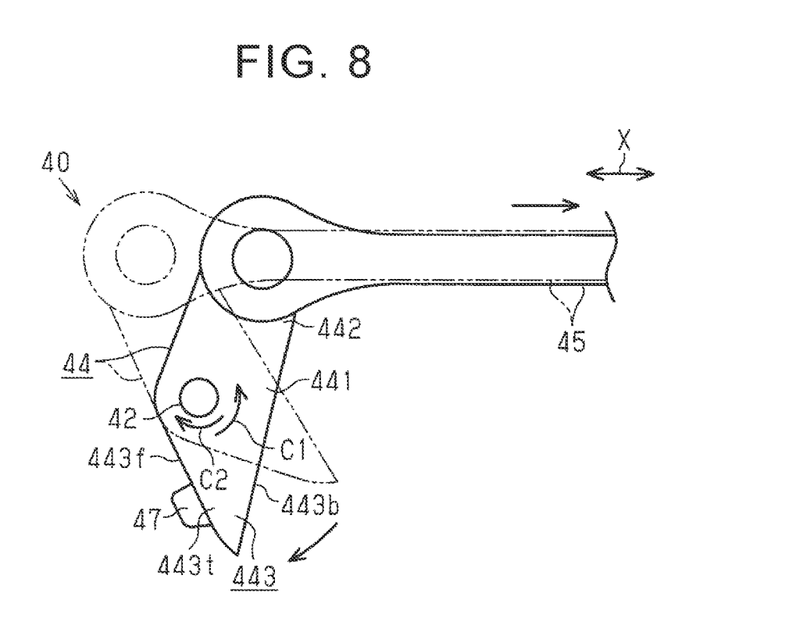
FIG. 8 is a side view illustrating a part of a turbocharger in another embodiment.

Note that the above embodiment can be modified to the following other embodiments. The second extension portion 443 in the drive arm 44 may have any given shape other than the shape described in the embodiment, provided that the front edge 443*f* is inclined so that the distal end side is placed on the valve-closing direction C1 side with respect to the base end side. For example, as illustrated in FIG. 8, the second extension portion 443 may have such a shape in which the front edge 443*f* is inclined so that the distal end side is placed on the valve-closing direction C1 side with respect to the base end side, but the rear edge 443*b* is not inclined. That is, differently from the description in the embodiment, the drive arm 44 may have a shape that is not bent in the middle from the distal end of the first extension portion 442 toward the distal end of the second extension portion 443.

The second extension portion 443 in the drive arm 44 may have any given configuration other than the configuration described in the embodiment, provided that the second extension portion 443 extends from the part of the fixed portion 441 on the opposite side from the first extension portion 442. For example, as illustrated in FIG. 9, the second extension portion 443 may be configured such that the front edge 443*f* is not inclined.

In the embodiment, the stopper 47 is configured to abut with the distal part 443*t* of the second extension portion 443. However, the stopper 47 may be placed so that a part of the second extension portion 443 on the base end side from the distal part thereof abuts with the stopper 47, as indicated by the alternate long and short dash line in FIG. 9, provided that the stopper 47 abuts with the front edge 443*f* of the second extension portion 443.

What is claimed is:

1. A turbocharger in which a turbine housing and a compressor housing are arranged in a reference direction, an outflow portion via which exhaust gas flowing through the turbine housing flows out into an exhaust pipe is provided, the outflow portion is provided on a distant side of the turbine housing from the compressor housing in the reference direction, the turbocharger comprising:

a valve body placed on an outflow portion side in the reference direction from a wastegate port and configured to open and close the wastegate port, the wastegate port inside the turbine housing being configured to cause the exhaust gas to detour around a turbine wheel;

a rotating shaft extending in a direction intersecting with the reference direction, the rotating shaft being inserted through an insertion hole provided on a side wall of the turbine housing;

a swing arm fixed to the rotating shaft and configured to support the valve body at a position distanced from a part of the swing arm fixed to the rotating shaft in a radial direction of the rotating shaft;

a drive arm placed outside the turbine housing and fixed to the rotating shaft;

a rod rotatably connected to the drive arm, the rod being connected to the drive arm at a position distanced from a part where the rotating shaft is fixed to the drive arm; and an actuator, wherein:

the rod is displaced toward a side approaching the compressor housing in the reference direction by driving of the actuator;

the drive arm, the rotating shaft, and the swing arm rotate in a valve-opening direction when the rod is displaced, so that the valve body is displaced toward a side approaching the outflow portion so as to be distanced from the wastegate port;

the drive arm includes a fixed portion to which the rotating shaft is fixed, a first extension portion, and a second extension portion;

the first extension portion extends from the fixed portion in a first direction intersecting with an extending direction of the rotating shaft and the rod is connected to the first extension portion;

the second extension portion extends in a second direction intersecting with the extending direction of the rotating shaft from a part of the fixed portion on an opposite side from the first extension portion;

the turbine housing is provided with a stopper configured to abut with the second extension portion;

the stopper is on a valve-opening direction side from the second extension portion when the valve body closes the wastegate port;

the stopper is configured to abut with the second extension portion when the valve body is distanced from the wastegate port; and the valve-opening direction is one rotation direction around the rotating shaft.

2. The turbocharger according to claim 1, wherein the stopper is placed on a rotational locus of a distal part which is a part of the second extension portion on a distal end side from a center of the second extension portion.

3. The turbocharger according to claim 1, wherein:

the outflow portion includes a flange configured to connect the exhaust pipe to the turbine housing;

a distal end side of a front edge of the second extension portion is on a valve-closing direction side from a base end side of the front edge of the second extension portion;

the stopper is placed on a compressor housing side in the reference direction from the flange;

the valve-closing direction is a rotation direction reverse to the valve-opening direction; and the front edge of the second extension portion is an edge of the second extension portion on the valve-opening direction side.

\* \* \* \* \*